(12) United States Patent
Ide et al.

(10) Patent No.: US 6,205,675 B1
(45) Date of Patent: Mar. 27, 2001

(54) DEHYDRATION MACHINE

(75) Inventors: Tetsuo Ide; Takefumi Ide, both of Fuji (JP)

(73) Assignee: Taizen Company Limited, Fuji (JP)

( * ) Notice: Subject to any disclaimer, the term of this patent is extended or adjusted under 35 U.S.C. 154(b) by 0 days.

(21) Appl. No.: 09/472,827

(22) Filed: Dec. 28, 1999

(30) Foreign Application Priority Data

Dec. 28, 1998 (JP) .................................................. 10-372299

(51) Int. Cl.$^7$ ........................................................ D06F 58/00
(52) U.S. Cl. ............................. 34/115; 34/119; 210/771
(58) Field of Search ............................ 34/61, 62, 63, 34/94, 95, 115, 116, 119, 128, 129, 144; 101/147, 148, 416.1, 424.1; 100/37, 110, 112; 162/207, 208, 358.3, 358.5, 359.1; 210/740, 741, 770, 771, 772

(56) References Cited

U.S. PATENT DOCUMENTS

| | | | |
|---|---|---|---|
| 4,079,524 | * | 3/1978 | Amicel et al. .......................... 34/95 |
| 4,102,791 | * | 7/1978 | Otte ...................................... 210/326 |
| 4,663,040 | * | 5/1987 | Elizondo et al. ..................... 210/402 |
| 4,782,747 | * | 11/1988 | Unger et al. ............................. 100/37 |
| 5,666,741 | * | 9/1997 | Bubik et al. ........................ 34/119 X |
| 5,669,155 | * | 9/1997 | Hughes et al. ..................... 34/115 X |
| 6,004,468 | * | 12/1999 | Barbulescu et al. ................. 210/771 |

* cited by examiner

*Primary Examiner*—Stephen Gravini
(74) *Attorney, Agent, or Firm*—Armstrong, Westerman, Hattori, McLeland & Naughton, LLP

(57) ABSTRACT

A dehydration machine includes a stuff tank, a stuff inlet provided at a lower portion of the stuff tank, a stuff outlet provided at an upper portion of the stuff tank, and a pair of drums each having a circumferential wall with a plurality of water passage apertures, the pair of drums being juxtaposed in the stuff tank. The pair of drums rotate adversely about its respective axis so as to introduce stuffs in the stuff tank therebetween from a lower side thereof. One of the drum is rotatable in an immovable manner, and the other of the drums is rotatable in an inclinable manner while being urged toward the one of the drums by an air spring. Each of the drums is provided with a metal net on an outer surface of the circumferential wall.

4 Claims, 2 Drawing Sheets

DEHYDRATION MACHINE

BACKGROUND OF THE INVENTION

1. Field of the Invention

This invention relates to a dehydration machine for dehydrating stuff such as used papers or virgin pulps.

2. Description of Related Art

Recycling of used papers has been demanded in the paper making industry for a long time in view of the need to better protect the natural environment. In this connection, various kinds of used paper processing machines have been developed in response to an increased demand of used papers.

An example of such machine is provided with a screw in a drum. The machine was designed to separate used paper into fibers and liquid by simply rotating, using the screws, used papers with liquid in the drum. However, in this machine, it was inevitable that a large amount of fibers flows out of the drum. Furthermore, it is not feasible to recycle the waste liquid that flows out of the drum because ink or the like is mixed therein.

The present inventors discover that it is effective to dehydrate used papers prior to the deinking process to enhance the deinking efficiency in the process. Based on the discover, the present inventors have accomplished the present invention.

SUMMARY OF THE INVENTION

The object of the present invention is to provide a dehydration machine which can effectively dehydrate stuff such as used papers or virgin pulps.

According to the present invention, a dehydration machine includes a stuff tank, a stuff inlet provided at a lower portion of the stuff tank, a stuff outlet provided at an upper portion of the stuff tank, and a pair of drums each having a circumferential wall with a plurality of water passage apertures, wherein the pair of drums is juxtaposed in the stuff tank. The pair of drums rotate adversely about its respective axis so as to introduce stuffs in the stuff tank therebetween from a lower side thereof. One of the drum is rotatable in an immovable manner, and the other of the drums is rotatable in an inclinable manner while being urged toward the one of the drums by an air spring. Each of the drums is provided with a mesh member on an outer surface of the circumferential wall.

It is also preferable that the mesh member provided on one of the drums (i.e., the immovable drum) is a metal fine mesh, and the mesh member provided on the other of the drums (i.e., the inclinable drum) is a metal course mesh.

The mesh member may include an inner metal mesh and an outer metal mesh, wherein the inner metal mesh is twice coarser than the outer metal mesh.

BRIEF EXPLANATION OF THE DRAWINGS

Other objects and advantages of the present invention will become apparent from the detailed description of the preferred embodiments with reference to the attached drawings, wherein.

DETAILED DESCRIPTION OF THE PREFERRED EMBODIMENTS

Figure 1:
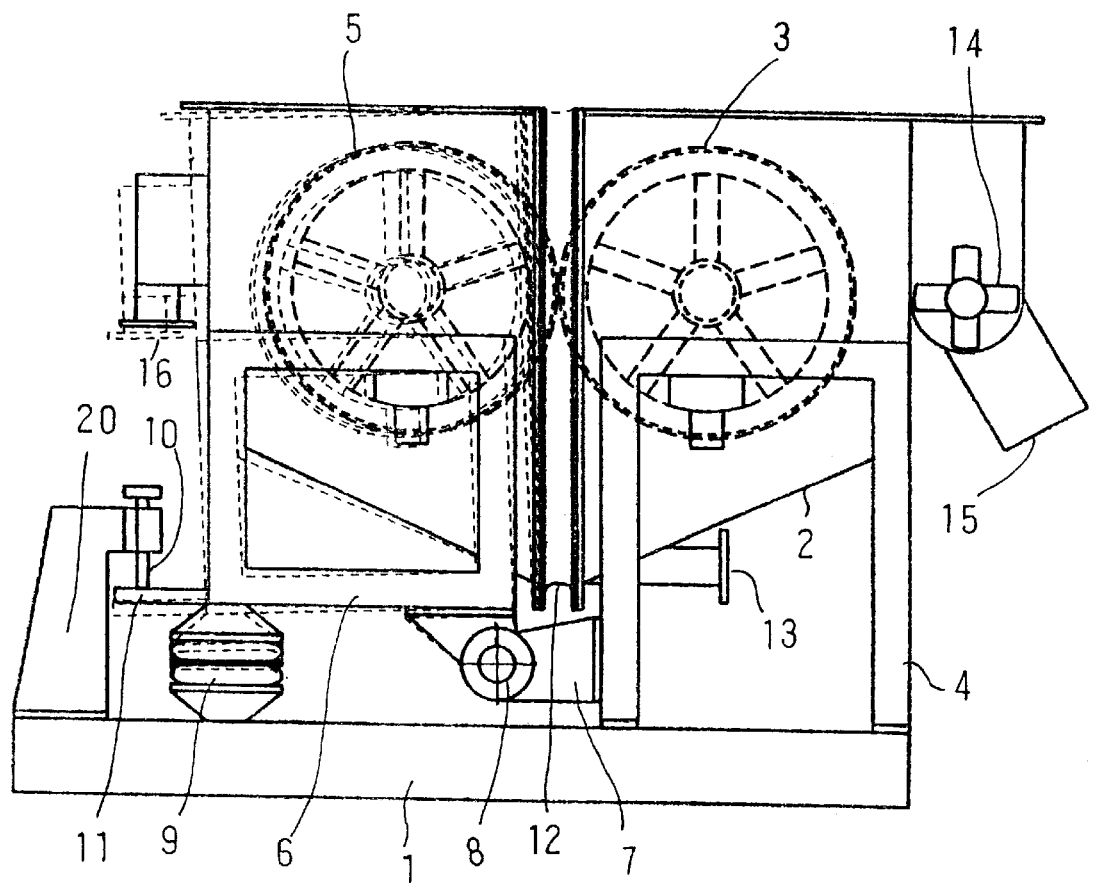
FIG. 1 is an explanatory view showing an embodiment of a dehydration machine according to the present invention.

Now referring to the drawings, an embodiment of the present invention is described.

Figure 2:
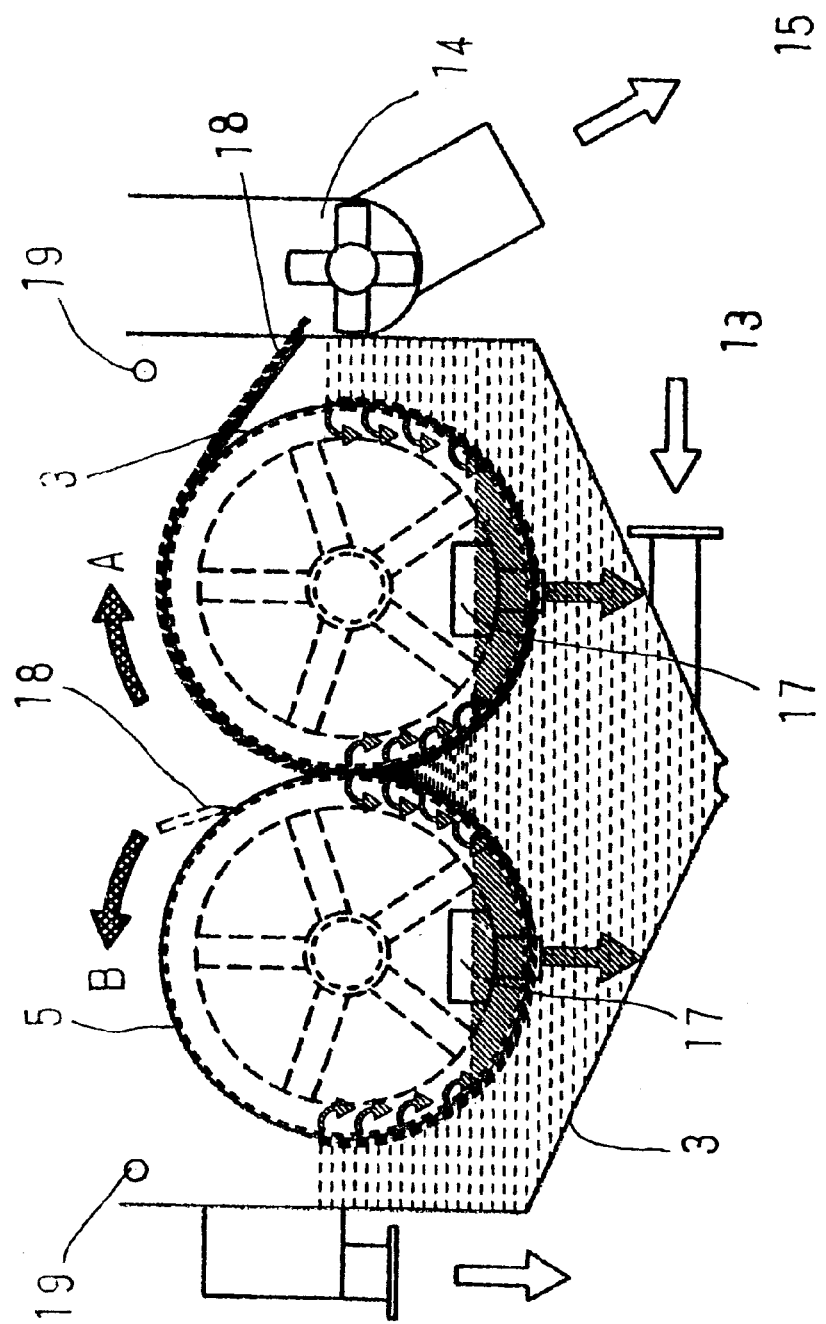
FIG. 2 is a cross sectional view showing main elements of the dehydration machine according to the present invention.

FIG. 1 is a side view of the whole structure of the concentration and dehydration machine according to the present invention. FIG. 2 is a vertical cross sectional view showing the essential part of the machine.

Firstly, the concentration and dehydration machine as a whole will be explained. The machine includes a main body base 1. Provided on the main body base 1 is a stuff tank 2 comprised of a right half tank and a left half tank connected by a flexible sealing member 12. The right half tank and the left half tank are supported by a first bracket 4 and a second bracket 6, respectively. The first bracket 4 supports a right-hand rotatable dehydration drum 3 (hereinafter referred to as "immovable drum"), and the second bracket 6 supports a left-hand rotatable dehydration drum 5 (hereinafter referred to as "inclinable drum"). The right side bottom portion of the second bracket 6 is rotatably connected to a fixing bracket 7 so as to be inclined about a fulcrum 8.

The immovable drum 3 is allowed only to rotate about its axis. On the other hand, the inclinable drum 5 is allowed not only to rotate but also to be slightly inclined together with the second bracket 6 about the fulcrum 8. An air spring 9 is provided so as to support the left side bottom portion of the second bracket 6. In order to regulate the limit of pressure applied to the second bracket 6 by the air spring 9, a securing piece 11 is provided at the left side bottom portion of the second bracket 6 so as to be engaged with a pressure limit stopper 10 attached to a third bracket 20 equipped at a left end of the main body base 1.

A stuff inlet 13 is equipped at the lower portion of the stuff tank (raw material tank) 2. At an upper side of the immovable drum 3, a conveyor 14 and a stuff outlet 15 are equipped. At the upper side of the inclinable drum 5, a stuff overflow mouth 16 is equipped. The stuff overflowed from the stuff overflow mouth 16 is returned to a stuff tank (not shown).

The left half tank 2 is repeatedly inclined with respect to the right half tank via the flexible sealing member 12 by increasing and reducing the pressure of the air spring 9 between a condition shown in a dotted line and a condition shown in a solid line shown in FIG. 1. Therefore, the compression degree of the stuff can be changed in accordance with the slightly increased or decreased area of the tangent portion (i.e., contact portion) of the immovable drum 3 and the inclinable drum 5.

Since the pressure limit stopper 10 is equipped so as to regulate the pressure caused between the immovable drum 3 and the inclinable drum 5, the pressure to be applied to the stuff can be adjusted. Furthermore, the deformation of these drums 3 and 5 can be prevented.

Next, referring to FIG. 2, the structure of the machine and the operation thereof will be explained.

The stuff is introduced into the stuff tank 2 through the stuff inlet 13 equipped at the lower portion of the stuff tank 2 in which two cylindrical drums each made of a punched metal and having a water passage are provided. An outer surface of a circumferential wall of the immovable drum 3 is covered with a mesh member including an outer fine metal mesh (e.g. a 25-mesh net) and an inner mesh twice coarser than the outer mesh.

On the other hand, an outer surface of a circumferential wall of the inclinable drum 5 is covered with a mesh member including an outer coarse metal mesh (e.g. a 16-mesh net) and an inner metal mesh twice coarser than the outer metal mesh. These two drums 3 and 5 are juxtaposed with a slight space therebetween as shown in FIGS. 1 and 2. The immovable drum 3 is allowed only to rotate by a motor and a decelerator (not shown). In contrast, the inclinable drum 5 is allowed to be inclined by increasing or decreasing the pressure of the air spring 9 while being rotated by the motor (not shown) and the decelerator (not shown).

When the stuff is introduced into the tank 2 through the stuff inlet 13, the water level of the stuff raises gradually. As shown in FIG. 2, the water flows into these drums 3 and 5 through the metal meshes and the apertures of the punched metal, and then flows out of these drums 3 and 5 through the water outlets 17. On the other hand, the fibers of the stuff are compressed at the tangent portion (i.e., the contact portion) of the immovable drum 3 and the inclinable drum 5 to be dehydrated. The water contained in the stuff flows into the drums 3 and 5, and then flows out of the drums 3 and 5 through the water outlets 17. This wasted water is filtered to be purified by passing the outer and inner meshes and the punched metal, which results in recyclable water.

With the structure described above, by rotating the two dehydration drums with metal meshes that are different in mesh size, a natural filtration and dehydration are performed. It is also possible to instantly and effectively dehydrate the stuff between the two dehydration drums by applying pressure therebetween using the air spring 9. Furthermore, the dehydrated paper fibers are attached in a sheet-like manner to a circumference of one of the two dehydration drums having a finer mesh, and stripped down by a scraper 18 when rotated by about 120 degree, then delivered by the conveyer 14 to perform the next process (i.e., deinking process). The immovable drum 3 and the inclinable drum 5 rotate in the direction of arrows A and B shown in FIG. 2, respectively. Showers 19 are also provided so as to supply water when required. The motor (not shown) may be small in size and power. However, the rotational speed of the motor may be adjusted at a wide range.

Although the aforementioned embodiment is directed to the machine for dehydrating used papers, the machine according to the present invention can also be used for dehydrating virgin pulps or the like.

The machine can dehydrate the stuff effectively before introducing the stuff into a deinking device, which enhances the deinking efficiency in the deinking device.

The following effects can be obtained as a result of the structure described above.

(1) When this dehydration machine is used, the stuff introduced at a concentration of 3 to 5% at the inlet side can be concentrated and dehydrated effectively to a concentration of 15 to 30% at the outlet side.

(2) As a natural vacuum method is adopted, the power cost can be minimized.

(3) As a high concentration process can be performed instantly, the stuff flow can be simplified.

(4) As a concentration of wasted water is extremely low, yield rate can be improved and the wasted water can be purified so as to be recycled.

(5) The processing efficiency can be unified by applying pressure by the air cushion regardless of the fluctuates of the concentration of the stuff at the inlet side.

(6) An installation space can be compact, and the maintenance can be performed easily.

(7) The machine functions well even if a smaller motor with smaller horse power is used.

The present invention claims priority based on Japanese Patent is Application No. H10-372299 filed on Dec. 28, 1998, the content of which is incorporated hereinto by reference in its entirety.

The terms and descriptions in this specification are used only for explanatory purposes and the present invention is not limited to these, but many modifications and substitutions may be made without departing from the spirit of the scope of the present invention which is defined by the appended claims.

What is claimed is:

1. A dehydration machine, comprising:

a stuff tank;

a stuff inlet provided at a lower portion of said stuff tank;

a stuff outlet provided at an upper portion of said stuff tank; and a pair of drums each having a circumferential wall with a plurality of water passage apertures, said pair of drums being juxtaposed in said stuff tank, wherein said pair of drums rotate adversely about its respective axis so as to introduce stuffs in said stuff tank therebetween from a lower side thereof, one of said drum being rotatable in an immovable manner, and the other of said drums being rotatable in an inclinable manner while being urged toward said one of said drums by an air spring, and wherein each of said drums is provided with a mesh member on an outer surface of said circumferential wall.

2. The dehydration machine according to claim 1, wherein said mesh member provided on said one of said drums is a metal fine mesh, and said mesh member provided on said the other of said drums is a metal course mesh.

3. The dehydration machine according to claim 2, wherein said mesh member includes an inner metal mesh and an outer metal mesh, said inner metal mesh being twice coarser than said outer metal mesh.

4. The dehydration machine according to claim 1, wherein said the other of said drums is repeatedly inclined with respect to said one of said drums by increasing and decreasing a pressure of said air spring.

* * * * *